(12) United States Patent
Lee et al.

(10) Patent No.: US 11,311,969 B2
(45) Date of Patent: Apr. 26, 2022

(54) EDGE PREPARATION FOR LASER WELDING

(71) Applicant: The Boeing Company, Chicago, IL (US)

(72) Inventors: Tristan E. Lee, Seattle, WA (US); Frederick W. Buldhaupt, South Prairie, WA (US); Leo E. Dondlinger, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 700 days.

(21) Appl. No.: 14/934,254

(22) Filed: Nov. 6, 2015

(65) Prior Publication Data
US 2017/0129050 A1    May 11, 2017

(51) Int. Cl.
*B23K 26/26* (2014.01)
*B23K 26/24* (2014.01)
(Continued)

(52) U.S. Cl.
CPC .......... *B23K 26/26* (2013.01); *B23K 26/0853* (2013.01); *B23K 26/24* (2013.01);
(Continued)

(58) Field of Classification Search
CPC ........ B23K 26/21; B23K 26/24; B23K 26/26; B23K 2201/16; B23K 2201/18
(Continued)

(56) References Cited

U.S. PATENT DOCUMENTS 3,406,444 A * 10/1968 Parker .................. B23K 9/0282
                                                     228/168
3,866,014 A *  2/1975 Waller ...................... H01F 3/02
                                                     219/137 R
(Continued)

FOREIGN PATENT DOCUMENTS

CN      101094745 A      12/2007
JP      2014-532000 A    12/2014
(Continued)

OTHER PUBLICATIONS

Extended European Search Report dated Mar. 17, 2017 in EP Application No. 16184392.5, 9 pages.
(Continued)

*Primary Examiner* — Tu B Hoang
*Assistant Examiner* — Vy T Nguyen
(74) *Attorney, Agent, or Firm* — MH2 Technology Law Group LLP

(57) ABSTRACT

Provided is a laser-weld manufacturing method. The method includes: providing a first component and a second component that are separated from one another by a gap, the gap having a depth and a width and at least one of the first component and the second component having a sacrificial edge-tab; exposing the sacrificial edge-tab to laser energy, the laser energy being sufficient to melt at least a portion of the sacrificial edge-tab; forming a melt-pool in the gap between the first component and the second component, the melt-pool including material from the melted portion of the sacrificial edge-tab; and solidifying the melt-pool to form a weld that joins the first component and the second component together.

17 Claims, 9 Drawing Sheets

(51) Int. Cl.
  *B23K 33/00* (2006.01)
  *B23K 26/08* (2014.01)
  *B23K 26/32* (2014.01)
  *C22C 38/08* (2006.01)
  *B23K 103/04* (2006.01)

(52) U.S. Cl.
  CPC .............. *B23K 26/32* (2013.01); *B23K 33/00* (2013.01); *C22C 38/08* (2013.01); *B23K 2103/04* (2018.08)

(58) Field of Classification Search
  USPC ....... 219/219, 121.63, 121.64; 428/594, 596, 428/131; 29/428
  See application file for complete search history.

(56) References Cited

U.S. PATENT DOCUMENTS

| | | | | |
|---|---|---|---|---|
| 5,205,468 | A * | 4/1993 | Budenbender | B23K 26/26 156/304.1 |
| 5,283,415 | A * | 2/1994 | Nishi | B23K 26/26 219/121.64 |
| 5,760,365 | A | 6/1998 | Milewski et al. | |
| 5,876,540 | A * | 3/1999 | Pannell | B29C 65/344 156/91 |
| 7,240,821 | B2 | 7/2007 | Talwar | |
| 8,534,339 | B2 | 9/2013 | Pham et al. | |
| 9,016,551 | B2 | 4/2015 | Kirkwood et al. | |
| 2004/0045943 | A1* | 3/2004 | Yabu | A63B 53/04 219/121.64 |
| 2009/0001060 | A1* | 1/2009 | Orye | B23K 33/00 219/121.64 |
| 2009/0280349 | A1* | 11/2009 | Bittendorfer | B23K 26/26 428/594 |
| 2013/0133171 | A1* | 5/2013 | Miguez Charines | B29C 70/42 29/428 |
| 2015/0367451 | A1* | 12/2015 | Shiner | B23K 26/389 428/596 |

FOREIGN PATENT DOCUMENTS

| | | |
|---|---|---|
| RU | 2065348 C1 | 8/1996 |
| RU | 2285599 C1 | 10/2006 |
| RU | 2288827 C1 | 10/2006 |
| RU | 67002 U1 | 10/2007 |
| RU | 94893 U1 | 6/2010 |
| WO | 2013/055477 A2 | 4/2013 |
| WO | 2015/159514 A1 | 10/2015 |

OTHER PUBLICATIONS

First Office Action dated Aug. 1, 2019 in corresponding Chinese Application No. 201610899461.6. (English translation and Chinese Office Action provided).
Communication pursuant to Article 94(3) EPC dated Jan. 23, 2020 in corresponding European Application No. 16184392.5 (5 pages).
Notification of Second Office Action dated Mar. 3, 2020 in corresponding Chinese Application No. 2016108994616 (in both English and Chinese), 13 pages.
Office Action dated Feb. 6, 2020 in corresponding Russian Application No. 2016133635/02(052181), 17 pages.
Notice for Reasons of Rejection issued in corresponding Japanese Patent Application No. 2016-207860 dated Oct. 22, 2020 with English language translation (8 pages).
Second Office Action dated Aug. 4, 2020 in corresponding Chinese Application No. 2016108994616 (14 pages).
Decision of Rejection dated May 25, 2021 in corresponding Japanese Application No. 2016-207860, 6 pages (includes English translation).
Examination Report No. 2 for Standard Patent Application dated Oct. 13, 2021 in corresponding Australian Application No. 2016216730, 4 pages.
Communication Pursuant to Article 94(3) EPC issued in corresponding European Application No. 16184392.5, 5 pages.
Decision of Rejection dated Feb. 1, 2021 in corresponding Chinese Application No. 2016108994616, includes English translation, 12 pages.
Examination Report No. 1 issued in corresponding Australian Application No. 2016216730, 3 pages.

* cited by examiner

EDGE PREPARATION FOR LASER WELDING

TECHNICAL FIELD

The subject matter described herein relates generally to the forming of articles and, more particularly, a method for forming modular component-based layup mandrels by laser welding.

BACKGROUND

In aircraft construction, the fuselage, wings, and other components of the aircraft may be formed of shaped laminated composite parts. Shaped laminated composite parts may be laid up ply-by-ply on a tool referred to as a layup mandrel (LM). The layup mandrel has a tool surface substantially matching the part which functions to shape the plies as they are laid up and compacted on the mandrel.

In conventional construction techniques for forming mandrels, the entire mandrel is fabricated and transported as one piece. In the case of a mandrel used for laying up a composite aircraft wing, such a mandrel can have a length of over one hundred feet and a width of over 30 ft. The fabrication tools to handle such large components are very specialized, and transporting such large mandrels is a time-consuming and labor-intensive process. Additionally, layup mandrels having complex contours and susceptibility to distortion are difficult to manufacture.

Accordingly, a method for fabricating a layup mandrel that overcomes challenges of the conventional methods would be a welcome addition to the art.

SUMMARY

In an example there is a laser-weld manufacturing method comprising: providing a first component and a second component that are separated from one another by a gap, the gap comprising a depth and a width and at least one of the first component and the second component comprising a sacrificial edge-tab; exposing the sacrificial edge-tab to laser energy, the laser energy being sufficient to melt at least a portion of the sacrificial edge-tab; forming a melt-pool in the gap between the first component and the second component, the melt-pool comprising material from the melted portion of the sacrificial edge-tab; and solidifying the melt-pool to form a weld that joins the first component and the second component together. In an example, there is a modular component-based layup mandrel formed according to this method.

In another example, there is a laser-weld manufacturing method, comprising: providing a first component comprising a first sacrificial edge-tab and a second component comprising a second sacrificial edge-tab, the first component and second component separated from one another by a gap; exposing the first sacrificial edge-tab and the second sacrificial edge-tab to laser energy, the laser energy being sufficient to melt at least a portion of the first sacrificial edge-tab and at least a portion of the second sacrificial edge-tab; filling at least some of the gap with a first volume of material from the first sacrificial edge-tab melted by the laser energy and a second volume of material from the second sacrificial edge-tab melted by the laser energy; and solidifying the first volume of material and the second volume of material in the gap to join the first component and the second component.

Advantages of the examples will be set forth in part in the description which follows, and in part will be understood from the description, or may be learned by practice of the examples. The advantages will be realized and attained by means of the elements and combinations particularly pointed out in the appended claims.

It is to be understood that both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this specification, illustrate examples of the present teachings and together with the description, serve to explain the principles of the disclosure.

DESCRIPTION OF THE EXAMPLES

Figure 1A:
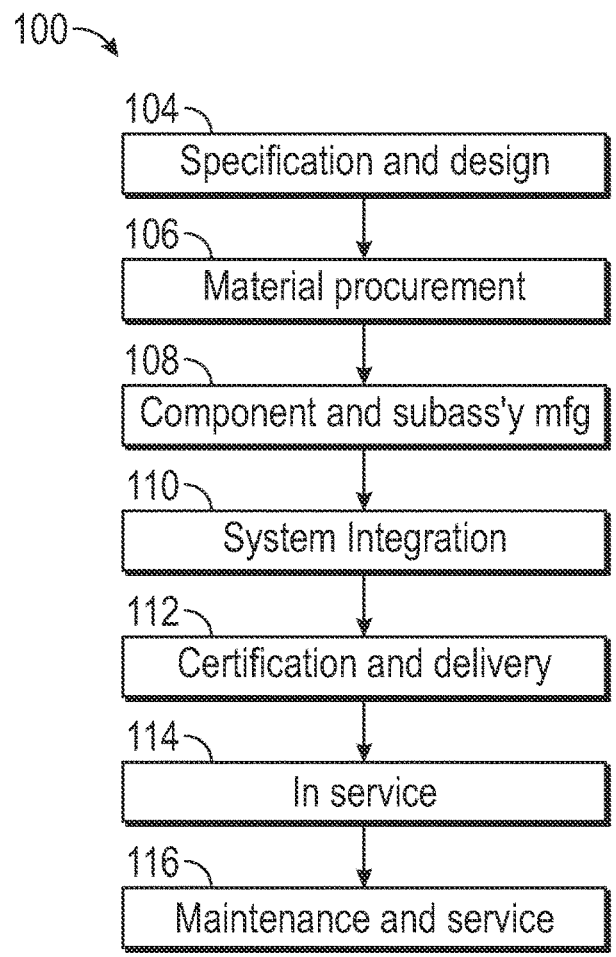
FIG. 1A is a flow diagram of aircraft production and service methodology, according to an example.

Reference will now be made in detail to the examples which are illustrated in the accompanying drawings. Wherever possible, the same reference numbers will be used throughout the drawings to refer to the same or like parts.

Notwithstanding that the numerical ranges and parameters setting forth the broad scope of the examples are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present examples. It is intended that the specification and examples be considered as exemplary only. The various examples are not necessarily mutually exclusive, as some examples can be combined with one or more other examples to form new examples. It will be understood that the structures depicted in the figures may include additional features not depicted for simplicity, while depicted structures may be removed or modified.

A laser-weldable component may include an edge portion and a sacrificial edge-tab extending from the edge portion. The sacrificial edge-tab may be consumed during a laser welding method for joining the laser-weldable component to another component. The sacrificial edge-tabs may comprise material that melts upon exposure to laser energy. The melted edge-tab material can form a melt-pool in a gap area between the components being joined together. The melt-pool subsequently solidifies to form a weld that joins the components. Such a method eases joint preparation tolerances, reduces post-weld work and enables laser welding of complex profiles, including, large, complex profiles of wing part layup mandrels. For example, layup mandrels traditionally machined and transported as a large unitary part can instead be fabricated by laser-welding modular components together, wherein the modular components are provided with sacrificial edge-tabs that are melted by the laser to form the weld portions.

For the purpose of this disclosure, the term, "sacrificial" refers to material that may be consumed, in part or in whole, during a manufacturing operation. For example, as used herein, the term "sacrificial edge-tab" may refer to a protrusion extending from at least one component that includes a volume of material that may be used in forming a weld. The "sacrificial edge-tab" may be melted by, for example, exposure to sufficient laser energy to at least partially fill a gap between two or more components and may be re-solidified to form a weld for joining the two or more components.

Figure 1B:
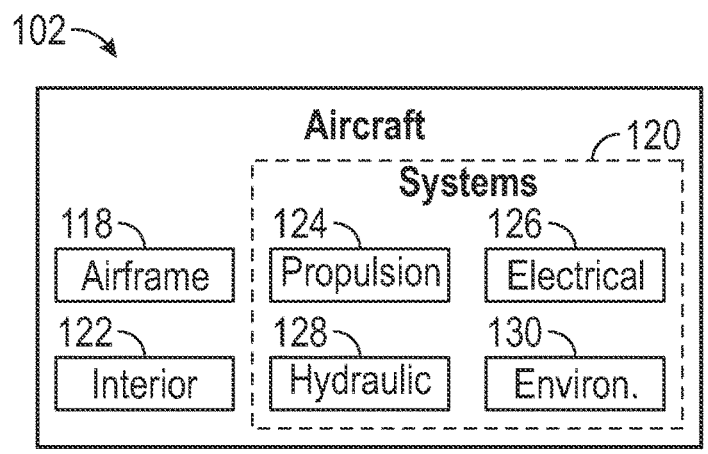
FIG. 1B is a block diagram of an aircraft, according to an example.

Referring more particularly to the drawings, examples of the disclosure may be described in the context of an aircraft manufacturing and service method 100 as shown in FIG. 1A and an aircraft 102 as shown in FIG. 1B. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 may be scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 1B, the aircraft 102 produced by exemplary method 100 may include an airframe 118 with a plurality of systems 120 and an interior 122. Examples of high-level ones of systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive or marine industries.

Figure 2:
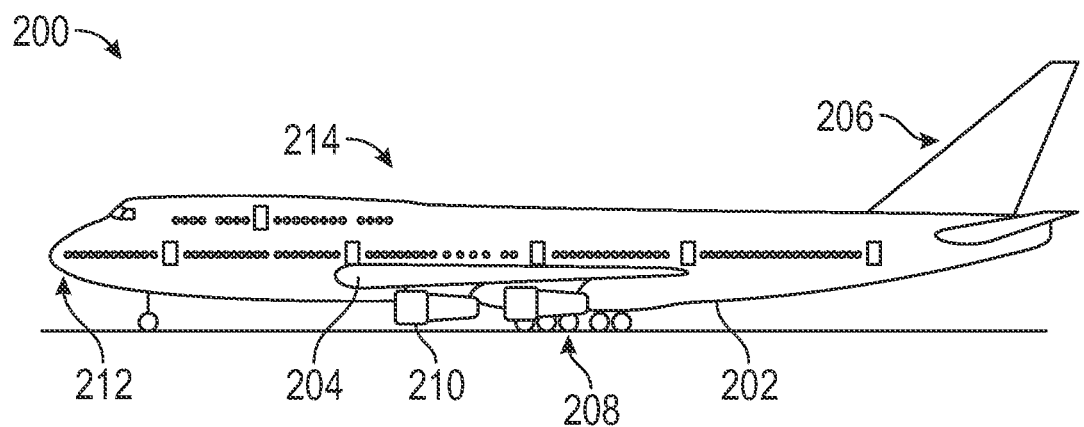
FIG. 2 is a schematic illustration of an aircraft, according to an example.

FIG. 2 is a side elevation view of an aircraft 200 having one or more composite parts fabricated on a laser-welded mandrel, such as that described below. One of ordinary skill in the art will appreciate that such laser-welded mandrels may be employed in manufacturing a wide variety of composite parts that may be incorporated at various locations, including the fuselage, wings, empennage, body, and walls of the aircraft 200. In alternate examples, laser-welded mandrels may be used in methods for forming composite parts for other types of structures, vehicles, and platforms, such as motor vehicles, aircraft, maritime vessels, or spacecraft, or other suitable applications.

In this example, the aircraft 200 includes a fuselage 202 including wing assemblies 204, a tail assembly 206, and a landing assembly 208. The aircraft 200 further includes one or more propulsion units 210, a control system 212 (not visible), and a host of other systems and subsystems that enable proper operation of the aircraft 200. A composite article fabricated on a laser-welded layup mandrel manufactured in accordance with an exemplary method of the disclosure may be employed in manufacturing any suitable portion of the aircraft 200, such as in wing assemblies 204, tail assembly 206, and any other suitable areas of the aircraft 200. In general, the various components and subsystems of the aircraft 200 may be of known construction and, for the sake of brevity, will not be described in detail herein.

Although the aircraft 200 shown in FIG. 2 is generally representative of a commercial passenger aircraft, including, for example, the 737, 747, 757, 767, 777, and 787 models commercially available from The Boeing Company of Chicago, Ill., the inventive laser-welded article and laser-welding methods disclosed herein may also be employed in the assembly of virtually any other types of aircraft. More specifically, the teachings of the present disclosure may be applied to the manufacture and assembly of other passenger aircraft, fighter aircraft, cargo aircraft, rotary aircraft, spacecraft and any other types of manned or unmanned air vehicle.

Figure 3A:
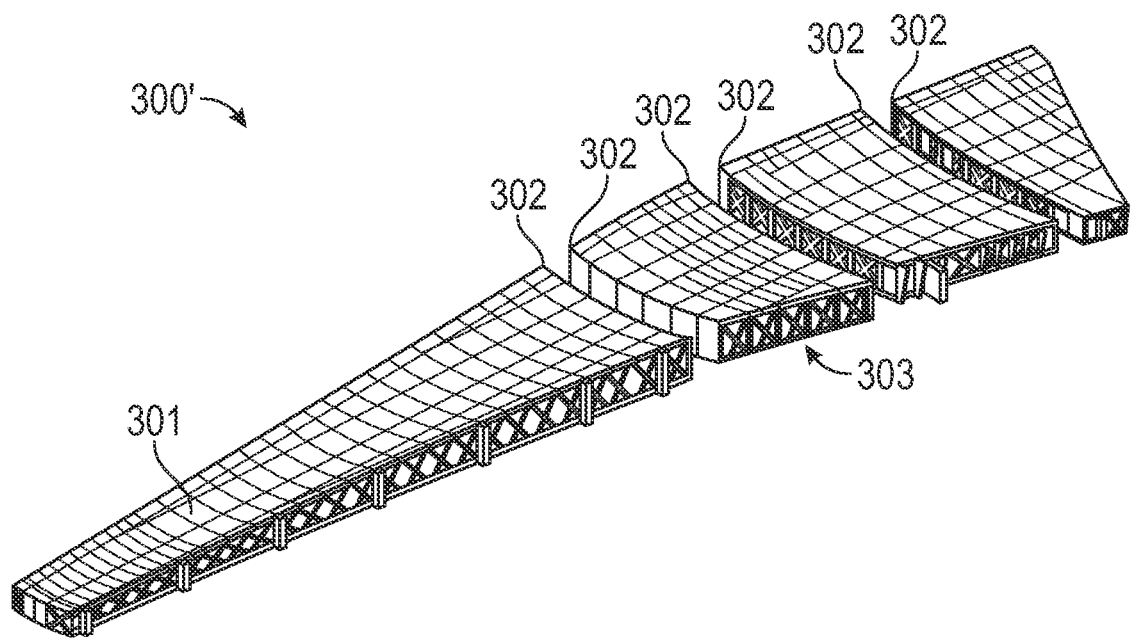
FIG. 3A is a perspective view of multiple modular components that may be laser-welded together to form a layup mandrel according to an example.

As shown in FIG. 3A, an article 300' may be formed in accordance with a method of this disclosure. The article 300' may include an assemblage of modular components, including first component 301 and second component 303. The article 300' may be formed by laser welding modular components, for example, first component 301 and second component 303, together and may comprise a layup mandrel on which composite aircraft structures may be assembled. Accordingly, at least one of the first component 301 and the second component 303 may include joints 302 which may be joined together.

Figure 3B:
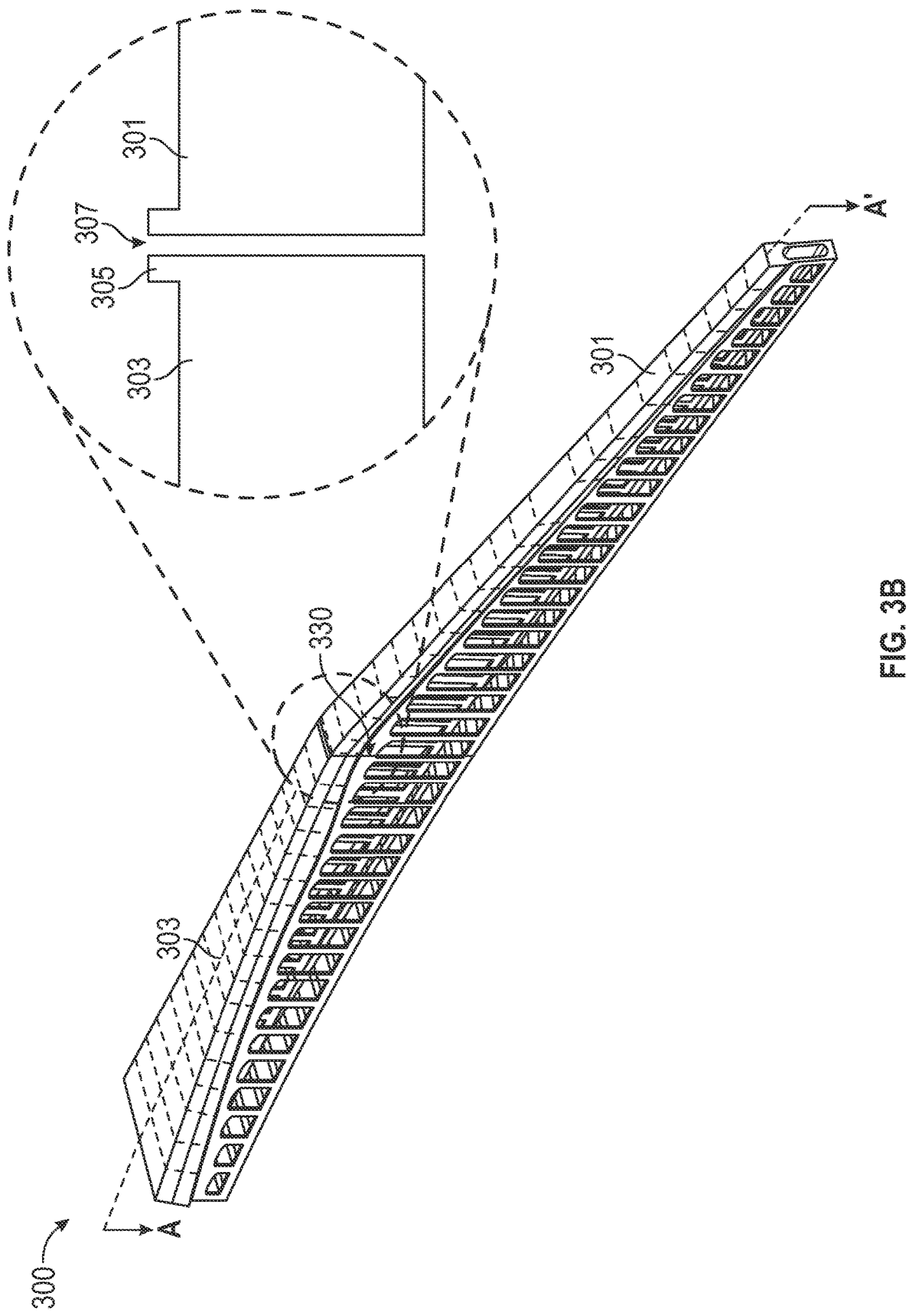
FIG. 3B is a perspective view of first and second components used for fabricating a layup mandrel according to an example, along with a zoomed-in inset showing details of the first and second components, including sacrificial edge-tabs.
Figure 3C:
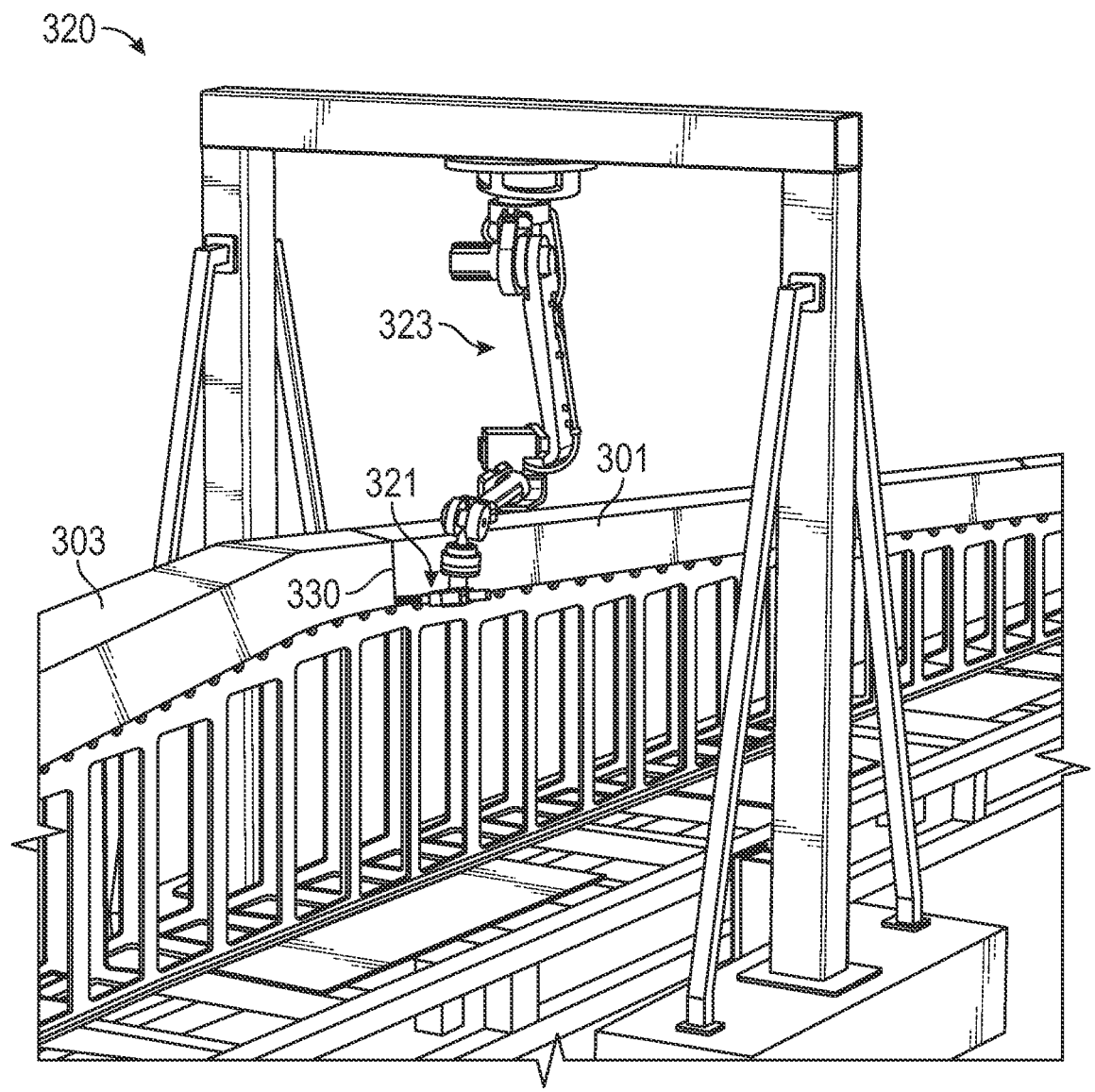
FIG. 3C is a perspective of the first and second components of FIG. 3B being laser-welded together according to an exemplary method as executed by a robotic laser-welding system to form a modular component-based layup mandrel.
Figure 3D:
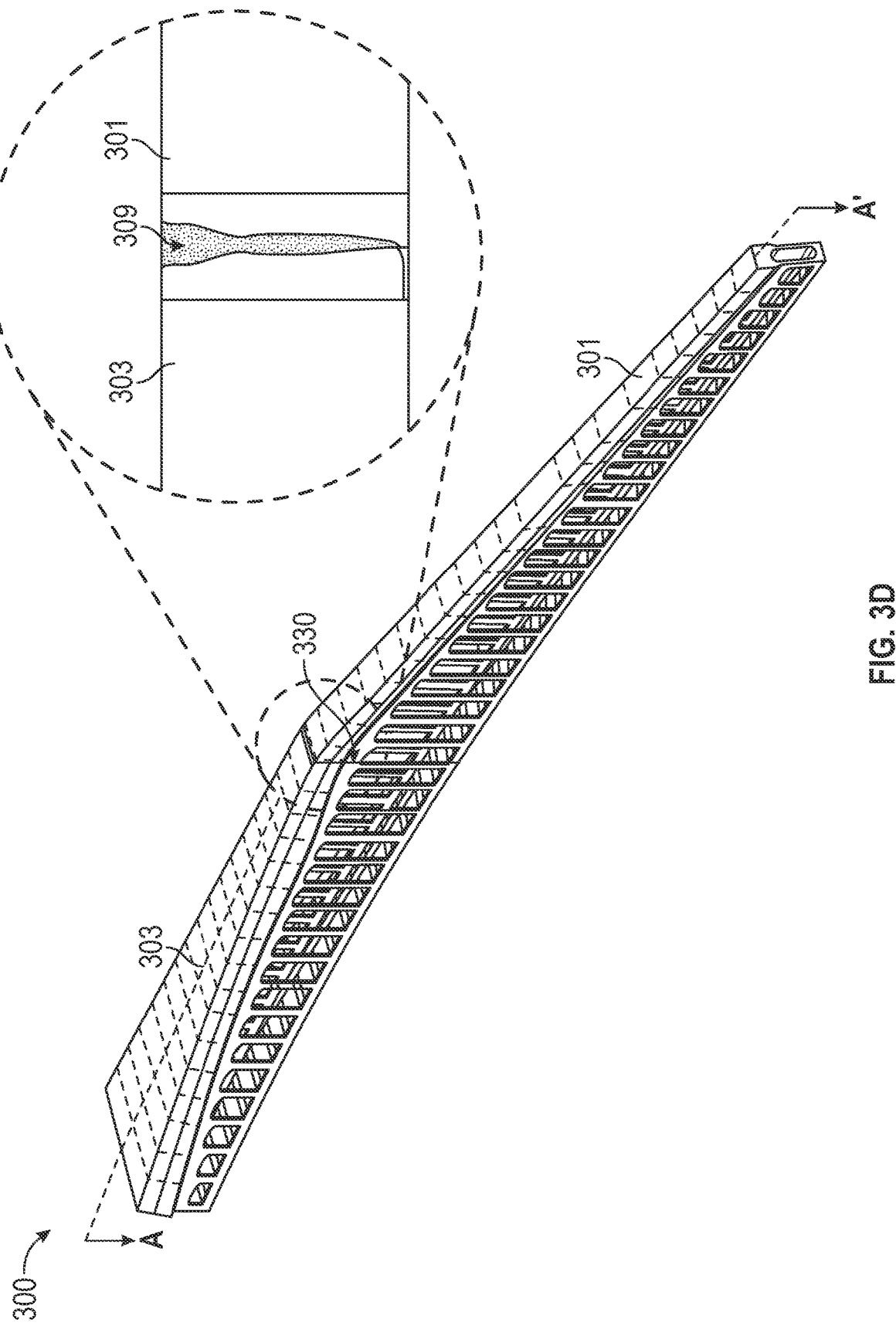
FIG. 3D is a perspective view of the first and second components of FIG. 3A along with a zoomed-in inset showing resulting weld details of the laser-weld formed in FIG. 3C.

To avoid warping such components as they are being joined together, laser-welding provides focused laser energy beams which do not heat large surfaces areas as compared to other welding techniques. Yet, because the laser energy provided by such laser sources have small laser spot sizes, the components' joints are typically provided with very tight tolerances which increases manufacturing time and cost. Accordingly, gaps between components being laser welded typically have high aspect ratio (i.e., depth to width ratio is very large) which minimizes heating. In other words, conventional laser-welding methods are not typically possible for use where a larger gap exists between components. However, as illustrated in FIG. 3B-3D, a method for joining such modular components—even in the case where a large gap exists between components—is provided. For example, in the method, first component 301 and the second component 303 separated by gap 307, may be joined together to form article 300. As shown in FIG. 3B at least one of the first component 301 and the second component 303 may comprise a sacrificial edge-tab 305 which, when exposed to sufficient laser energy, are at least partially melted to form a melt-pool that subsequently solidifies to form a weld 309.

As shown in FIG. 3C, a gantry system 320 with a robotic arm 323 that includes a laser 321 may be utilized for welding the first component 301 and the second component 303 together. The gantry system 320 may be configured to move the robotic arm 323 and laser 321 to predetermined weld position 330. As shown in FIG. 3D, when the laser is activated over the first component 301 and the second component 303 at the weld position 330, the laser 321 melts at least a portion of the sacrificial edge-tab 305 to form a melt-pool that, upon solidifying, forms a weld 309 that joins the first component 301 and the second component 303 together. While not limited to any particular example, providing components with sacrificial edge-tabs as described herein reduces or eliminates undercutting.

The laser may be any suitable laser usable for laser-welding metal parts used in space, air, land or sea vehicles. In an example, the laser 321 may be a 15 kW neodymium-doped yttrium aluminum garnet (Nd:$Y_3Al_5O_{12}$) (Nd: YAG) Fiber Laser, although the laser is not so limited any may be another type of laser such as YAG crystal or $CO_2$ laser, and may have a different power rating In an example, delivery of the laser energy may be controlled. For example, the laser energy frequency, spot size, directionality, power, may be controlled by a laser source. The directionality may include a predetermined patterned, such as oscillating a laser beam comprising the laser energy and having a spot size, the oscillating comprising directing the laser beam back and forth between the first component and the second component. The laser source may include a controller which receives instructions from a computer. Although the laser 321 in FIG. 3C is shown attached to a robotic arm 323, the examples are not so limited. In fact, the laser may be a hand-held laser and may be controlled by a human operator to provide laser energy to laser-weld components together.

The first component 301, the second component 303, and/or the sacrificial edge-tabs 305 may comprise any suitable material for use as a layup mandrel. In an example, the material of the first and second components may include, but not be limited to one or more of metal alloys, including but not limited to steel with 36% nickel (also referred to as "FeNi 36" or tradename "INVAR 36"), titanium, mild steel, aluminum and alloys thereof. The laser energy may be sufficient to melt at least a portion of the first component, the second component and sacrificial edge-tab of the first and/or second component.

Figure 4A:
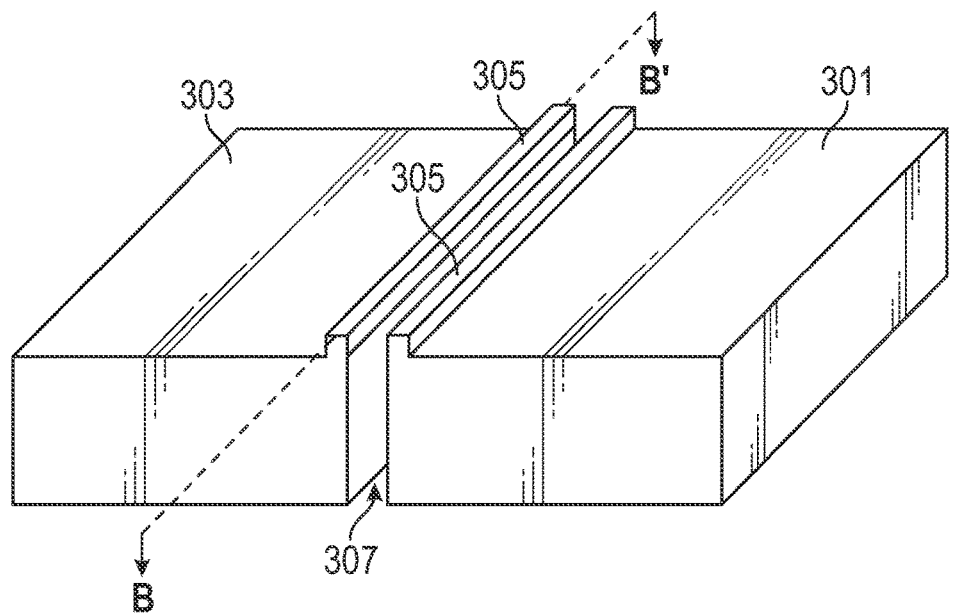
FIGS. 4A-4E illustrate operations of a manufacturing method according to an example.

FIGS. 4A-4E illustrate operations in a laser-weld manufacturing method for forming an article, such as a layup mandrel. As shown in FIG. 4A, at least one of first component 301 and second component 303 are provided and may comprise a sacrificial edge-tab 305. In an example, both of the first component 301 and second component 303 have a respective one of an edge-tab 305. First component 301 and second component 303 may be separated from one another by a gap 307 that has a depth and a width. The gap's depth may be defined by a first distance extending in a direction defined by a thickness of at least one of the first component 301 and second component 303. The gap's width may be defined by a distance between components 301 and 303. In an example, the gap can comprise a width of between about 0.030" and about 0.005".

Figure 4B:
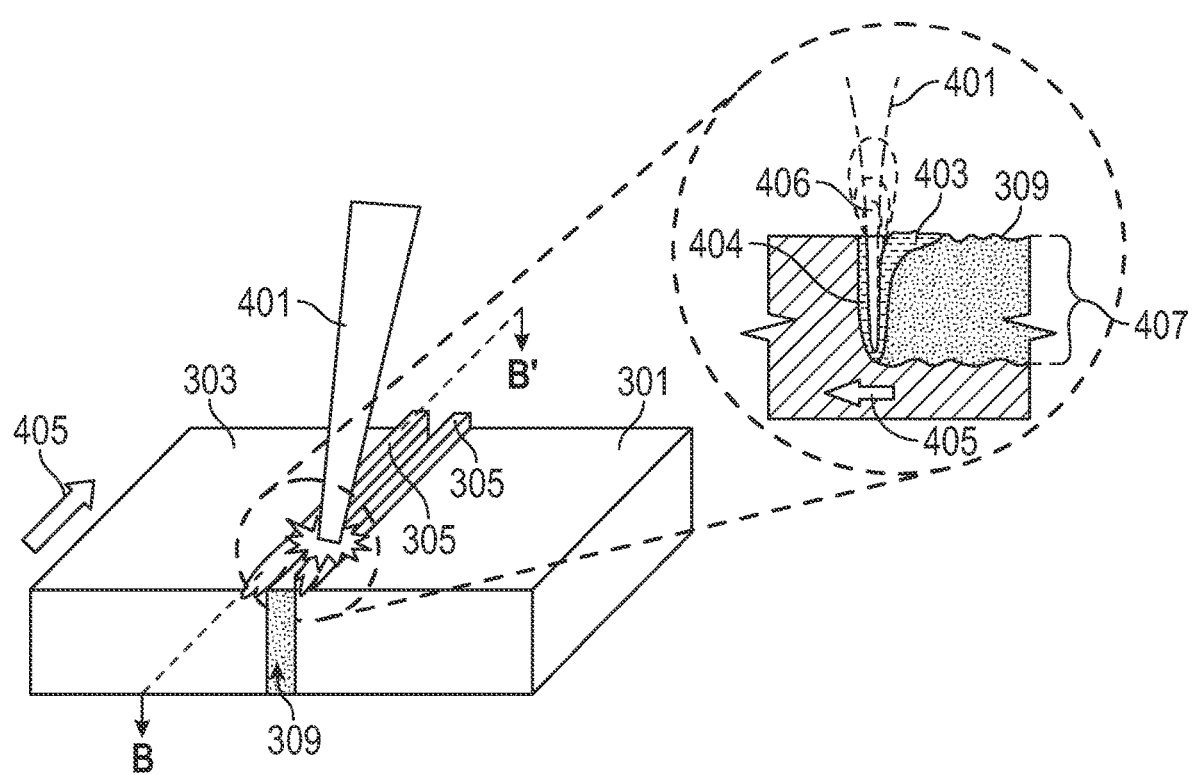
Figure 4C:
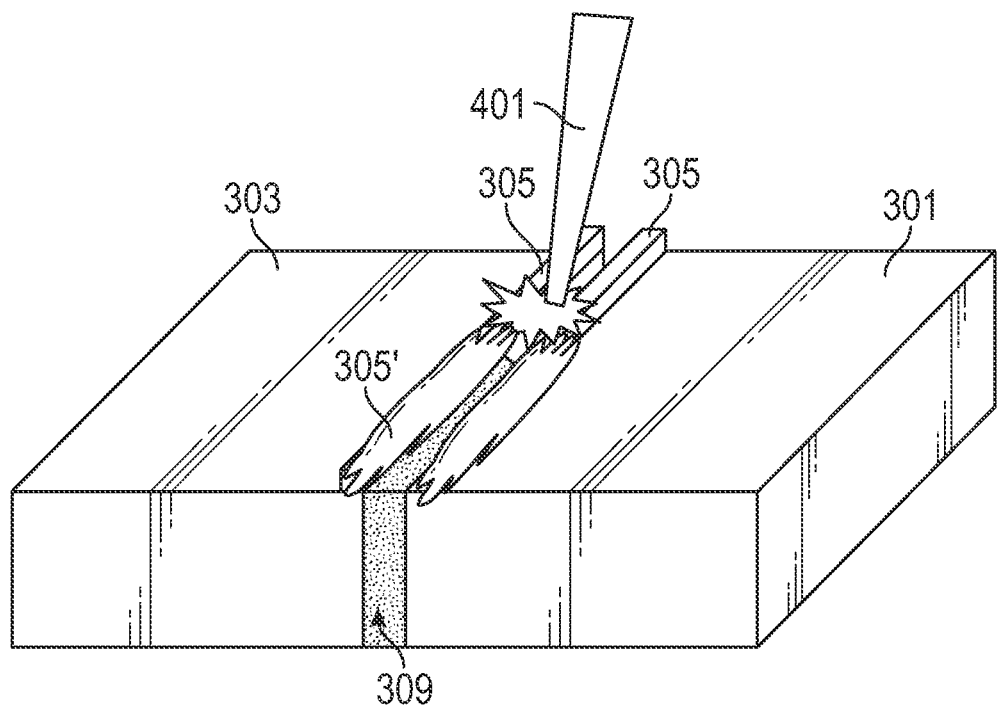
Figure 4D:
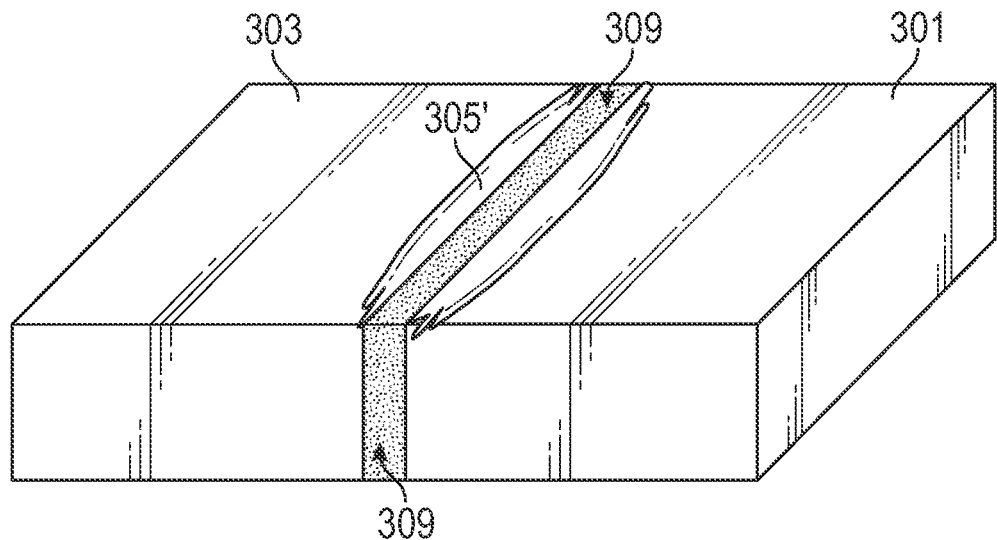

As shown in FIGS. 4B-4D, sacrificial edge-tab 305 is exposed to a laser 401 as a laser source moves along in a direction 405. In an example, the laser energy is provided by a laser source that moves the laser energy along a preselected direction 405, for example, at a speed of between about 0 to about 250 inches/minute, such as about 150 inches/minute. Returning to FIG. 4A, a sacrificial edge-tab 305 may extend substantially an entire length of the first component 301 and/or the second component 303. However, other examples are not so limited and the sacrificial edge-tab may only run a partial length of the first component and/or the second component. Additionally, sacrificial edge-tab 305 is not limited to any particular shape or cross-section. For example, sacrificial edge-tab 305 may have a substantially uniform cross-sectional area or a non-uniform cross-sectional area, a substantially symmetrical cross-sectional shape or a non-symmetrical cross-sectional shape. Sacrificial edge-tab 305 may also have a cross-sectional shape that includes rounded features, linear features or a combination of both. In an example, sacrificial edge-tab 305 may have a circular or semi-circular cross-section. In an example, sacrificial edge-tab 305 may have a polygonal cross-sectional shape. That is, sacrificial edge-tab 305 may have a triangular, square, rectangular or n-sided cross-sectional shape. Further, a surface of the sacrificial edge-tab 305 and a surface of the first component 301 and/or the second component 305 may comprise a continuous surface therebetween or may be separated by a corner, wherein the corner is defined by an angle. In an example, the angle may be about 90°, or may be an angle other than 90°.

The laser energy may be preselected such that it is sufficient to melt portion 305' of the sacrificial edge-tab 305 as shown in the inset. For example, the laser 401 may irradiate the sacrificial edge-tab 305, the first component 301 and/or the second component 303. As a result of delivery of sufficient laser energy to melt portions of the first component 301, the second component 303 and/or the sacrificial edge-tab 305, laser 401 may induce formation of a steam capillary 404 which may be ejected as, for example, metal steam, at a penetration depth 407 of up to about ½-inch in the first component 301, second component 303 and/or sacrificial edge-tab 305. As the laser energy moves along in direction 405, melted portion 305' of at least the sacrificial edge-tab 305 form a weld melt-pool 403. The melt-pool 403 accumulates in the gap 307 between the first component and the second component and subsequently solidifies as weld 309 that joins first component 301 and second component 303 together.

In an example, the first component 301 comprises a first one of a sacrificial edge-tab 305, the second component 303 comprises a second one of a sacrificial edge-tab 305, and the laser 401 comprises a spot size 406 that extends the gap and over at least one of the first sacrificial edge-tab and the second sacrificial edge-tab. In an example, the gap 307 width is not sufficiently larger than the spot size 406 of the laser energy. Otherwise, if the laser spot size is too small, it may penetrate through the gap without interacting with a surface of the first or second component, such as the sacrificial edge-tabs thereof. For example, the spot size 406 may be provided by a laser source in the range from about 0.008" to about 0.018". In an example, the laser spot size is not limited so long as it comprises enough energy to melt at least a portion of the sacrificial edge-tab 305. Additionally, the laser 401 may be manipulated so as to manipulate a direction of the laser-energy. For example, the laser energy may be moved along a length of the sacrificial edge-tab, across and between the first and second component, for example, in a back-and forth motion, or a combination of motions. Meanwhile, although the size of the first component and the second component is not necessarily limited, the sacrificial edge-tab 305 may comprise a volume of material that forms a melt pool that at least partially fills the gap between the first and second component to form a weld. The volume may be such that when the material of the sacrificial edge-tab is melted and forms a melt pool between the first and second component, for example, via laser welding thereof, it is a large enough volume to minimize or eliminate undercut and it is also a small enough volume to minimize or eliminate the need for grinding off excess weld material.

Figure 4E:
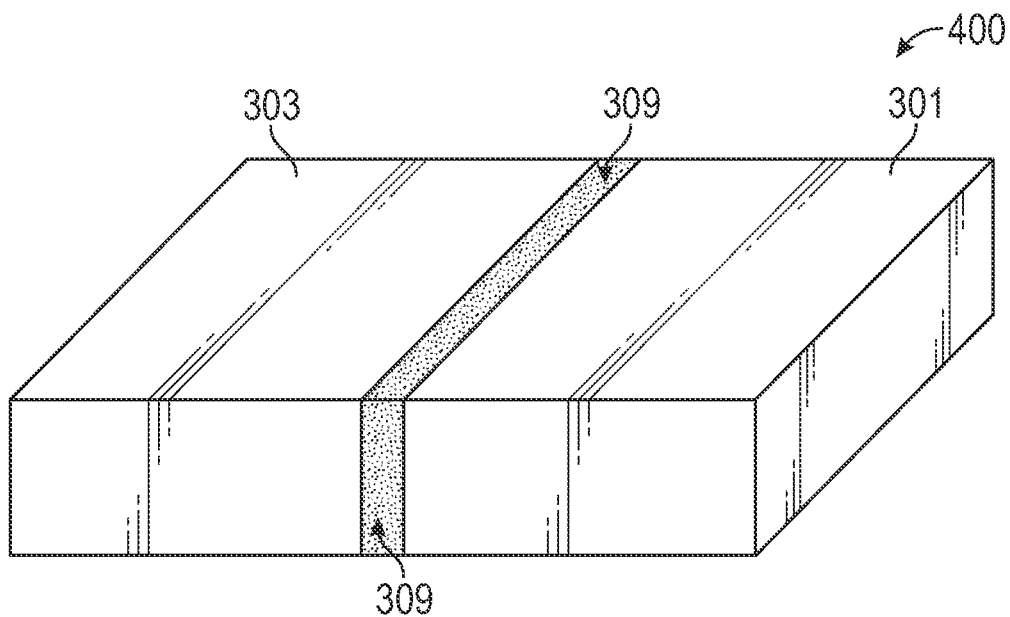

In summary, the melt-pool may comprise material from the melted portion 305' of the sacrificial edge-tab 305. As the melt-pool 403 cools, it solidifies to form a weld 309 that joins the first component 310 and the second component 303 together. Optionally, as shown in FIG. 4E, the remaining portions of the sacrificial edge-tabs 305, including melted portions 305' thereof which may not form the weld, may be removed from a surface of the first component 301 and the second component 303 leaving a laser-welded article 400, which may be a laser-welded layup mandrel.

Figure 5:
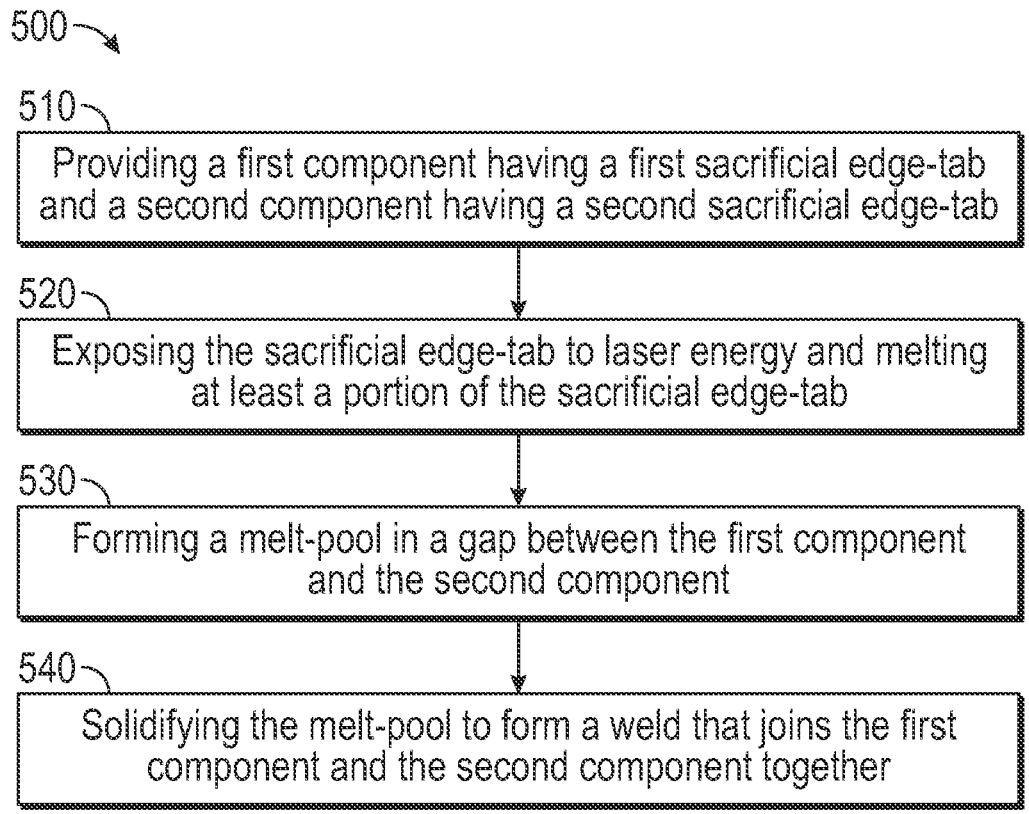
FIG. 5 is a flow chart describing a method for manufacturing an article according to an example.

Referring to the flow diagram of FIG. 5, with additional reference to the layup mandrel, components and methods of FIGS. 3B-3D and the operations shown in FIGS. 4A-4E as described above, a method 500 may be utilized for forming an article 300 such as a structural component that includes a first component and a second component that are laser-welded together. Generally, at operation 510 one or more of a first component 301 and a second component 303 may be positioned near one another and separated by a gap 307. At least one of the first component and the second component may comprise a sacrificial edge-tab 305. An advantage of a gap 307 between the first component and the second component is that the welds formed therein exhibit reduced porosity relative to other welding methods, for example, those that require no gaps relying instead on component faces with tight tolerances and a joint fit between faces. Accordingly, a density of the weld may be different than a density of the first component, the second component or both the first and the second components.

At operation 520, the first and second components 301 and 303, respectively, are placed in proximity of a lasing system such that the sacrificial edge-tab is exposed to laser energy. By way of example, in some examples, the lasing system which may be embodied as a gantry system 320 comprising a robotic arm 323 which controls a laser 321 as described above for FIG. 3C, which is sufficiently large to accept the assembly of structural components. The lasing system is configured to deliver laser energy to melt at least a portion of the sacrificial edge-tab, but may also melt other portions of the first component and the second component.

At operation 530 a melt-pool 403 is formed in the gap 307 between the first component 301 and the second component 303. As described above, the material forming the melt-pool 403 can include at least some of the melted portion 305' of the sacrificial edge-tab. At operation 540, the first component 301 and the second component 303 are laser-welded together in the laser welding system by virtue of solidifying the melt-pool to form a weld 309 that joins the first component and the second component together.

Figure 6:
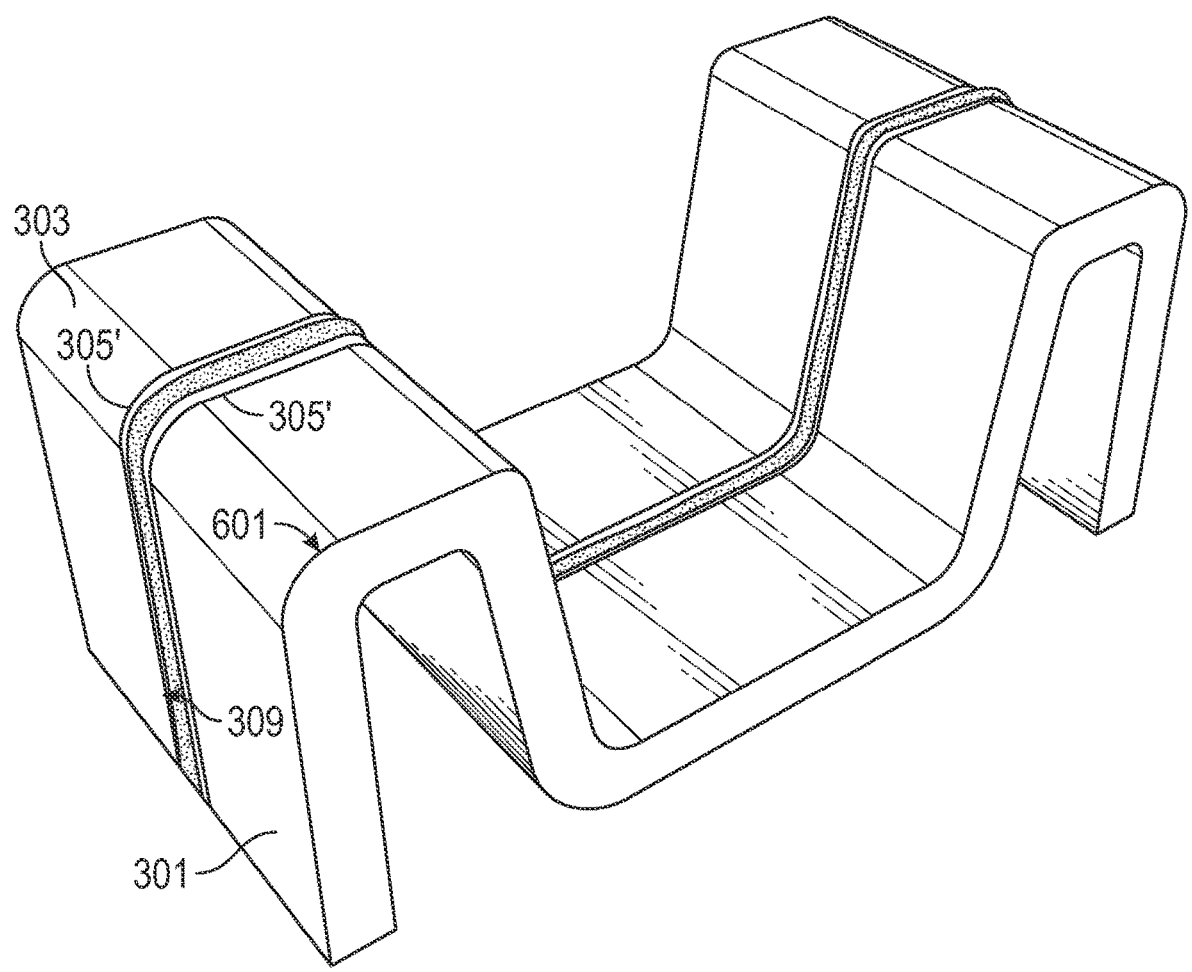
FIG. 6 shows first and second components with contoured surfaces joined together by a laser-welding method according to an example.

In one example, practice of the methods described herein can include laser-welding of contoured surfaces of an article 600. For example, as shown in FIG. 6, at least one of the first component 301 and the second component 303 of article 600 may comprise a contoured surface 601. The sacrificial edge-tab may, therefore, extend at least partially across the contoured surface. Thus, as shown in FIG. 6, the laser energy as described in other examples can be provided to form a melt portion 305' of a sacrificial edge-tab that extends at least partially across the contoured surface 601. Some of the melted portion 305' of the sacrificial edge-tab material forms a melt-pool in a gap between the first component 301 and the second component 303, as described in other examples, and can subsequently solidify to form a weld 309 between the first component and second component.

While the examples have been illustrated respect to one or more implementations, alterations and/or modifications can be made to the illustrated examples without departing from the spirit and scope of the appended claims. In addition, while a particular feature of the examples may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the descriptions disclosed herein. It is intended that the specification and examples be considered as exemplary only, with a true scope and spirit of the examples being indicated by the following claims.

What is claimed is:

1. A laser-weld manufacturing method, comprising:
   providing a first component and a second component that are completely separated from one another by a gap, the gap having a depth and a width, wherein at least one of the first component and the second component comprises a sacrificial edge-tab;
   exposing at least one of the first component, the second component, and the sacrificial edge-tab to laser energy, the laser energy being sufficient to melt at least a portion of the at least one of the first component, the second component, and sacrificial edge-tab to a penetration depth up to 0.5 inches in at least one of the first component, the second component, and the sacrificial edge-tab;
   forming a melt-pool in the gap between the first component and the second component, the melt-pool comprising material from the melted portion of the sacrificial edge-tab; and
   solidifying the melt-pool to form a weld that joins the first component and the second component together,
   wherein the first component and the second component are at least one of steel, titanium, mild steel, aluminum, or alloys thereof,
   wherein the width of the gap is from 0.005" to 0.030"; and wherein a density of the weld is different than a density of the first component, the second component or both the first and the second components.

2. The method of claim 1, wherein a spot size of the laser energy is greater than the width.

3. The method of claim 2, wherein the spot size of the laser energy is in a range from about 0.008" to about 0.018".

4. The method of claim 1, wherein the sacrificial edge-tab extends an entire length of the first component or the second component.

5. The method of claim 1, wherein the first component comprises a first sacrificial edge-tab, the second component comprises a second sacrificial edge-tab, and the laser energy comprises a spot size that is greater than the width of the gap, a width of at least one of the first sacrificial edge-tab and the second sacrificial edge-tab, or both.

6. The method of claim 1, wherein at least one of the first component and the second component comprises a contoured surface and the sacrificial edge-tab extends at least partially across the contoured surface.

7. The method of claim 6, wherein the laser energy irradiates a portion of the sacrificial edge-tab that extends at least partially across the contoured surface.

8. The method of claim 1, wherein a laser source directs the laser energy over a surface of the first component, the second component, the sacrificial edge-tab or combinations thereof at a speed of up to 250-inches/minute, and wherein the laser source is a 15 kW neodymium-doped yttrium aluminum garnet (Nd: YAG) Fiber Laser.

9. The method of claim 1, wherein the first component, the second component, or both the first component and the second component comprise a steel alloy comprising 36% nickel.

10. The method of claim 1, further comprising controlling a direction of the laser energy to provide the laser energy along a length of the sacrificial edge tab.

11. The method of claim 1, further comprising controlling a direction of the laser energy to provide the laser energy back and forth between the first component and the second component.

12. The method of claim 1, wherein the sacrificial edge-tab comprises a volume of material that is less than a volume of the gap.

13. The method of claim 1, wherein the sacrificial edge-tab comprises a volume of material that is greater than a volume of the gap.

14. The method of claim 1, further comprising removing a remaining volume of sacrificial edge-tab material that is not melted upon exposure to the laser energy.

15. The method of claim 14, wherein the removing comprises grinding the remaining volume of sacrificial edge-tab material.

16. A laser-weld manufacturing method, consisting of:
providing a first component comprising a first sacrificial edge-tab and a second component comprising a second sacrificial edge-tab, the first component and second component are completely separated from one another by a gap;
exposing the first sacrificial edge-tab and the second sacrificial edge-tab to laser energy, the laser energy being sufficient to melt at least a portion of the first sacrificial edge-tab and at least a portion of the second sacrificial edge-tab;
filling at least some of the gap with a first volume of material from the first sacrificial edge-tab melted by the laser energy and a second volume of material from the second sacrificial edge-tab melted by the laser energy; and
solidifying the first volume of material and the second volume of material in the gap to form a weld that joins the first component and the second component together,
wherein the first and second sacrificial edge-tabs have a volume of material that is less than a volume of the gap;
wherein the first component and the second component are at least one of steel, titanium, mild steel, aluminum, or alloys thereof, and
wherein the gap width is from 0.005" to 0.030".

17. The method of claim 16, wherein a density of the weld is different than a density of the first component, the second component, or both the first and the second components.

* * * * *